Sept. 16, 1941.   E. F. HARTLOVE   2,256,250
PORTABLE BRAKE ANALYZER
Filed April 23, 1940
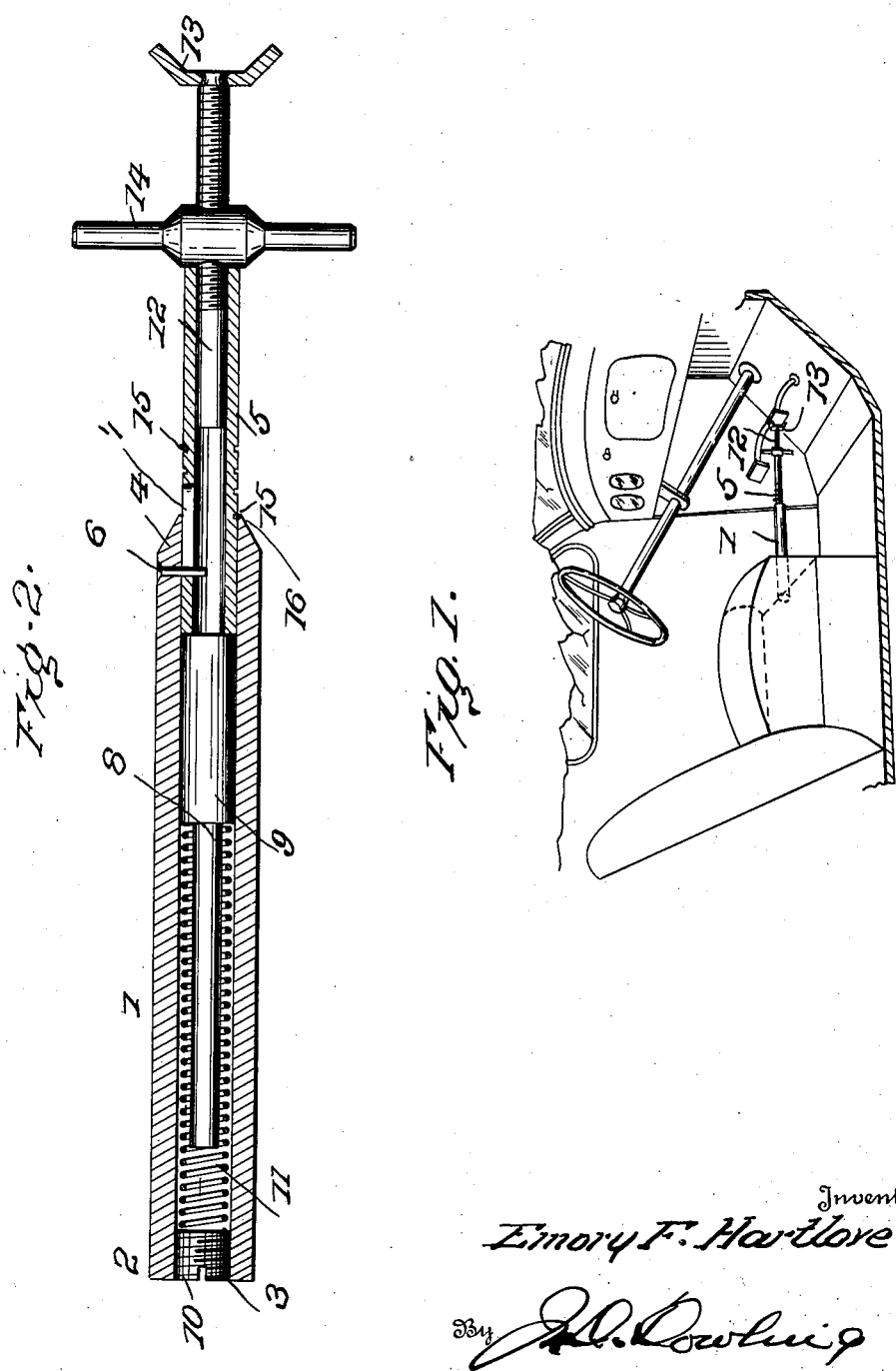
Inventor
Emory F. Hartlove
By
Attorney Patented Sept. 16, 1941

2,256,250

UNITED STATES PATENT OFFICE 2,256,250

PORTABLE BRAKE ANALYZER

Emory F. Hartlove, Baltimore, Md.

Application April 23, 1940, Serial No. 331,255

1 Claim. (Cl. 254—100)

This invention is directed to an improvement in a portable brake analyzer wherein provision is made to determine the braking leverage of the brake pedal with a view to obtaining knowledge as to the efficiency of the brakes.

The present invention is designed with a view to providing a device of this type in which the parts are relatively few in number and of extreme simplicity. The association of the parts one with the other to produce the completed device requires the minimum of labor and are so constructed that they cannot be wrongly assembled and, short of breakage, cannot get out of order.

The invention is illustrated in the accompanying drawing, in which

Figure 1 is a broken perspective view illustrating the application of the improvement;

Figure 2 is an enlarged longitudinal sectional view partly in elevation showing the improved analyzer.

The improved construction comprises an elongated cylindrical casing 1 opened at what may be termed the rear end 2 and having an interior bore 3 of uniform diameter throughout and opening through what will be termed the forward end 4 of the casing. Slidably mounted in the forward end of the bore 3 is a gauge tube 5 limited in longitudinal movement in the bore in both directions through the medium of a pin 6 in the casing, passing through a slot 7 in the tube 5. Slidable in the bore 3 is a rod 8 having its forward end enlarged at 9 to substantially though slidably fit in the bore and bear against the end of the gauge tube 5.

The gauge tube is thus capable of limited movement in both directions within the bore of the casing 1. The rear end 2 of the casing is interiorly threaded to receive a removable closing plug 10, and between this plug and the rear end of the enlargement 9 is arranged a coil spring 11 which is fitted appropriately in the bore 3 and surrounds the rod 8, with the latter serving to prevent jamming of the spring end ensuring its smooth action.

An exteriorly threaded rod 12 fits loosely within the gauge tube 5. The rod 12 is provided at its forward end with a stirrup-like member 13 designed to engage the appropriate part of the plug tube or other brake mechanism being tested. An elongated wing nut 14 has threaded engagement with the rod 13 and bears against the forward or free end of the gauge tube.

The gauge tube 5 is formed with a series of gauge lines 15, the rearmost of which is, when the parts are in normal position, in alignment with the forward end 4 of the casing 1, which forward end may be cut away as at 16 to provide a narrow edge to register with the gauge lines. If the tension of the spring is known and the spacing of the gauge lines also known with respect to that tension, it is quite apparent that under endwise pressure on the stirrup 13, the gauge tube is forced inwardly against the tension of the spring 11 until one or the other of the gauge lines 15, of which, of course, there may be any number, registers with the extreme forward ends of the casing 1.

In use, as shown in Fig. 1, the stirrup 13 is placed against the end of the brake pedal and the rear end of the casing 1 against a fixture, such as the wall of the front seat. The wing nut 14 is then turned, exerting pressure on the gauge tube and moving the same rearwardly against the tension of the spring 11 to cause a particular gauge line to register with the forward end of the casing. As the application of the brake pedal is, of course, in this movement resisted by the application of the brake, it is quite possible to more or less accurately gauge the efficiency of the brake pedal in its braking function. Of course, in this test, one or more of the wheels should be elevated, so that the brake application may be determined by attempting to turn the wheel. Any excessive movement of the gauge tube within the casing will demonstrate an undesirable condition of the brakes and enable the driver to correct the same before using the car. Each wheel may be tested and if the improved instrument indicates proper brake pedal control for the three wheels without properly braking the fourth wheel, information is at once obtained as to the necessity for correcting the braking instrument peculiar to the fourth wheel, or, in fact, any other wheel or wheels which may be defective.

The particularly essential feature of the present invention is its extreme simplicity in construction and arrangement and the few parts necessary to complete it.

There is an entire absence of any fluid pressure and thus no liability of leakage after continued use of the instrument. There are no parts to get out of order—all parts are readily and conveniently separable one from the other, and may be replaced or renewed with great ease and little expense. The threaded rod 12 is merely lifted from the gauge tube and the latter, as well as the spring, readily movable through either end of the casing following displacement of the plug 10, and removal of pin 6. In addition to this simplicity of construction, and extreme freedom from disorder, the parts may, and obviously will, be so ruggedly constructed as to withstand hard and continued usage not ordinarily incident to an instrument of this type involving the use of fluid pressure.

What is claimed as new is:

A brake analyzer including an elongated casing formed with a bore of uniform diameter open through both ends thereof, a gauge tube slidable in the bore at one end of the casing and limited in movement in both directions, a spring guide rod movable in the casing and formed with an enlargement at one end approximating the diameter of the bore of the casing and bearing against one end of the gauge tube, a plug closing the open end of the casing remote from the gauge tube, a coil spring interposed between the plug and the enlargement on the rod to resist inward movement of the gauge tube, said spring encircling the rod to guide and prevent jamming thereof, a threaded rod freely movable in the end of the gauge tube remote from the plug, a nut on the threaded rod bearing on the gauge tube whereby the gauge tube and rod may be relatively moved, and a stirrup on one end of the threaded rod to engage the brake pedal.

EMORY F. HARTLOVE.